United States Patent [19]

Hutchinson et al.

[11] 3,827,515

[45] Aug. 6, 1974

[54] WEIGHING SCALE

[75] Inventors: William Y. Hutchinson, Chicago; Walter P. Kushmuk, Niles, both of Ill.

[73] Assignee: Continental Sale Corporation, Chicago, Ill.

[22] Filed: Mar. 21, 1973

[21] Appl. No.: 343,549

Related U.S. Application Data

[62] Division of Ser. No. 254,767, May 18, 1971, Pat. No. 3,743,040.

[52] U.S. Cl. ............................. 177/241, 177/258
[51] Int. Cl. ...................... G01g 21/28, G01g 21/08
[58] Field of Search ........... 177/241, 243, 256, 258, 177/259

[56] References Cited
UNITED STATES PATENTS

| | | |
|---|---|---|
| 2,216,421 | 10/1940 | Ruge .................................. 177/241 |
| 3,193,034 | 7/1965 | Hutchinson et al ................. 177/256 |
| 3,589,460 | 6/1971 | Hanssen ............................. 177/256 |

*Primary Examiner*—George H. Miller, Jr.
*Attorney, Agent, or Firm*—Johnston, Keil, Thompson & Shurtleff

[57] ABSTRACT

A weighing scale is provided having a number of features including a folding column or pillar, a new type of weighing mechanism, a new type of beam scale, and a new type of knob assembly for weight indicating means for a beam scale, all arranged in a compact form which is completely portable and adapted for packing, shipping and storage.

4 Claims, 29 Drawing Figures

PATENTED AUG 6 1974 3,827,515

WEIGHING SCALE

This is a division, of application Ser. No. 254767, filed May 18, 1971, now U.S. Pat. No. 3,743,040.

BACKGROUND

Beam weighing scales are known in the art and attempts have heretofore been made to provide folding scales as illustrated, for example, by U.S. Pat. Nos. 326,025, 2,539,570 and 3,596,725. The present invention is concerned with platform scales and more particularly platform scales of the folding beam type.

In the scales of this type heretofore proposed, the scales have often been cumbersome of the method of construction has required a flexible connection between the weighing platform mechanism and the weight indicating mechanism. An example of this is U.S. Pat. No. 3,596,725 where a flexible connector in the form of a chain is used.

OBJECTS

One of the objects of the present invention is to provide a relatively simple beam scale in which a weighing platform is mounted on a weighing mechanism which in turn is mounted on a base and the beam is carried by a column or pillar which can be swung from an upright position downwardly to a horizontal position in juxtaposition to the weighing platform and which has a collar slidable on the column or pillar which engages the members extending upwardly from the base when the column or pillar is in the upright position, thereby restraining movement of the column or pillar in the upright position and permitting movement of the column or pillar to said horizontal position by pulling said collar upwardly away from said upwardly extending members.

Another object of the invention is to provide a weighing scale of the type described in which the weighing mechanism is connected to the weight indicating means through the column which is hollow by a non-flexible connection.

A further object of the invention is to provide a weighing scale of the type described wherein the column or pillar has a stop member projecting downwardly from the lower end thereof and adapted to prevent said column from pivoting in more than one direction.

Another object is to provide a weighing scale of the type described which has means for detachably securing a stop member of the type described to the base.

Still a further object of the invention is to provide a weighing scale having a base, a weighing mechanism mounted on said base, a weighing platform mounted on said weighing mechanism, and weight indicating means operable in response to said weighing mechanism characterized by the fact that a rigid elongated tubular structure is fixed to the base beneath the weighing platform and force transmitting means in said tubular structure are arranged to transfer a cumulative force from said weighing mechanism to said weight indicating means.

Another object of the invention is to provide a weighing scale of the type described in which the weighing mechanism mounted between the base and the platform contains two long levers and a pair of shorter levers, the long levers being pivotally mounted from the base at one end and converging toward one another at the other ends and the shorter levers each being pivotally mounted from the base at one end and having the other end pivotally connected to an intermediate part of one of said longer levers, together with pivotal means connecting said longer levers adjacent their converging ends which are pivotally connected to force transmitting means pivotally mounted from said base.

An additional object of the invention is to provide a weighing scale of the type described having a new and improved type of beam structure.

Still a further object of the invention is to provide a new and improved type of knob assembly for weight indicating means for a beam weighing scale.

Other objects and advantages of the invention will appear from the following description in conjunction with the accompanying drawings.

BRIEF SUMMARY OF THE INVENTION

Briefly summarized, the invention provides a number of features as follows:

1. A new and simplified folding column or pillar for a weighing scale is provided wherein the position of the column or pillar is controlled by a collar which is slidable on the column or pillar.

2. A weighing scale of the beam type is provided in which the weighing mechanism is connected to the weight indicating means contained in the beam through a hollow column by a non-flexible connection whereby the column pivots around a horizontal axis between pivot means mounted on members extending upwardly of the base and the connection is on approximately the same horizontal axis.

3. A folding beam weighing scale is provided having a column in which a stop member projects downwardly from the lower end thereof and prevents the column from pivoting in more than one direction, and wherein means can also be provided for detachably securing said stop member to the base.

4. A weighing scale is provided comprising a base with a rigid elongated tubular structure fixed thereto which enhances the rigidity of the base and provides a housing for force transmitting means which housing, due to the strength of the tubular structure, prevents distortion of the force transmitting means which might otherwise interfere with the accuracy of the weighing mechanism.

5. A weighing scale is provided in which the weighing mechanism comprises a pair of long levers each pivotally mounted from the base at one end and converging toward one another at the other ends and a pair of shorter levers each pivotally mounted from the base at one end and having the other end pivotally connected to an intermediate part of one of the longer levers, pivotal means connecting said longer levers adjacent their converging ends, said last named means also being pivotally connected to force transmitting means pivotally mounted from said base.

6. A new and improved type of beam for a beam scale is provided in which the tare weight is readily adjustable by a rotating member and larger and smaller poise weights are readily adjustable by knobs which are easily moved linearly and maintain predetermined positions.

7. New and improved knob assemblies are provided which are made from molded complementary members that are adapted to snap together with an indexing member inserted between them.

DETAILED DESCRIPTION OF THE INVENTION

Folding Column Mechanism

Figure 1:
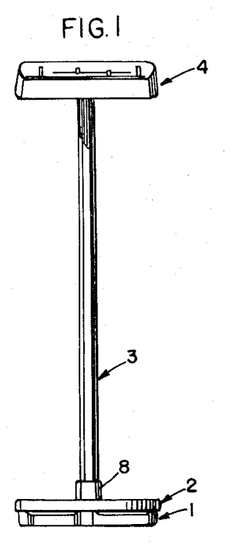
FIG. 1 is a front elevational view of a folding beam weighing scale provided in accordance with the invention.
Figure 2:
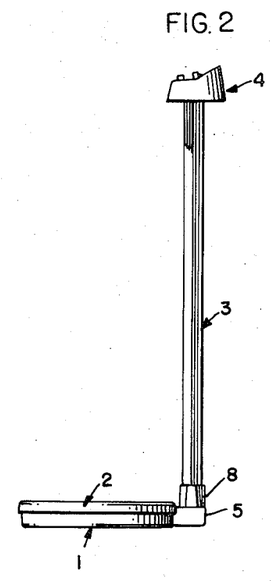
FIG. 2 is a side elevational view of the weighing scale shown in FIG. 1.
Figure 3:
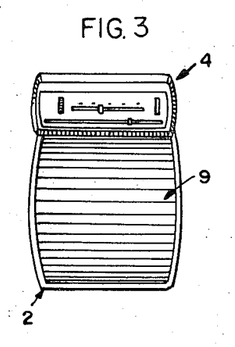
FIG. 3 is a top plan view of the weighing scale shown in FIGS. 1 and 2.
Figure 4:
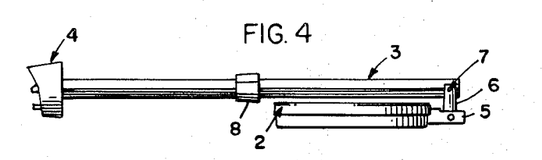
FIG. 4 is a side elevational view of the weighing scale shown in FIGS. 1, 2 and 3 in its folded position.
Figure 5:
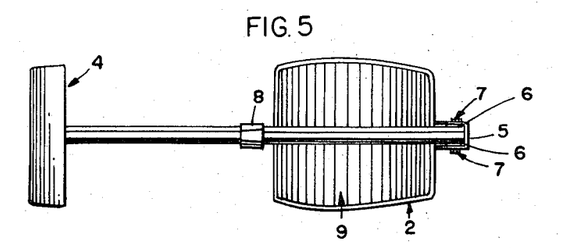
FIG. 5 is a top plan view of the weighing scale of FIG. 4 in its folded position.

Referring to the drawings, the weighing scale illustrated in FIGS. 1 to 5 comprises a base 1, a weighing platform 2, a column or pillar 3, and a weighing beam 4. The back of the base 1 has an extension 5 on which is mounted two upwardly extending members 6 pivotally connected at 7 to column or pillar 3. A collar 8 is slidably mounted on column or pillar 3 and fits closely to the exterior portions thereof and to the exterior portions of the upwardly extending members 6 when said column or pillar is in its upright position shown in FIG. 2. By sliding the collar 8 upwardly column or pillar 3 can be rotated around pivot means 7 to a position in which it is in juxtaposition to the weighing platform 2 as shown in FIGS. 4 and 5. In this position the weighing scale can be packaged, shipped and stored in a minimum amount of space. The upper part of platform 2 can be provided with a mat 9 made of rubber or any other suitable material.

Figures 6, 7:
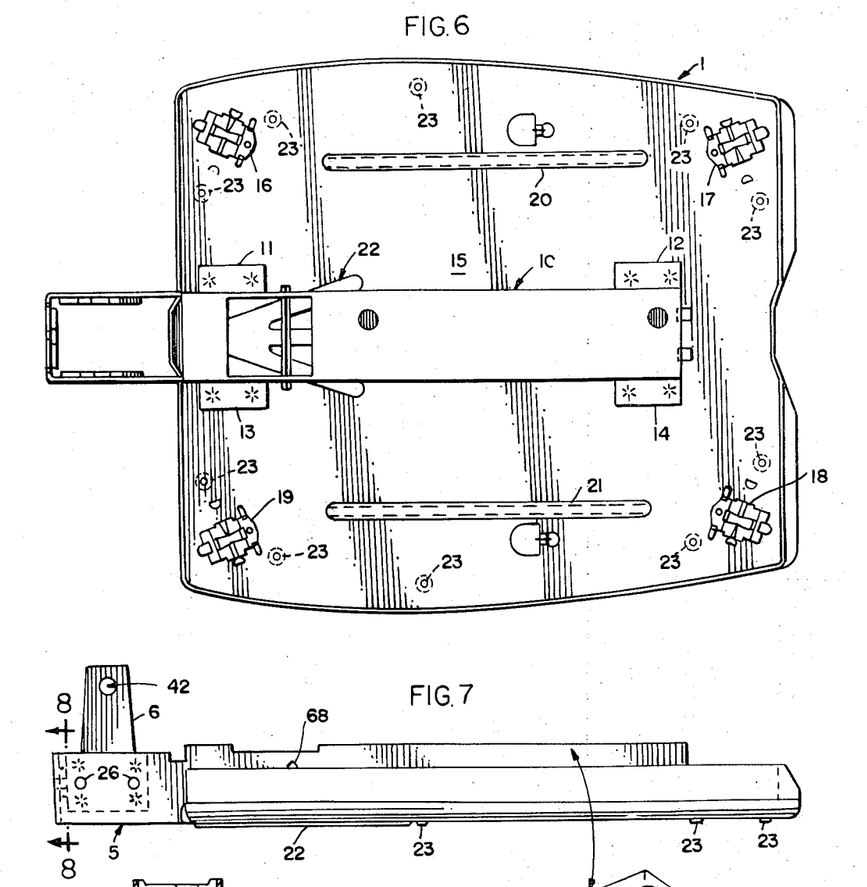
FIG. 6 is a top plan view of the base of a weighing scale of the type described in the preceding figures.
FIG. 7 is a side elevational view of the base shown in FIG. 6.
Figures 8, 9:
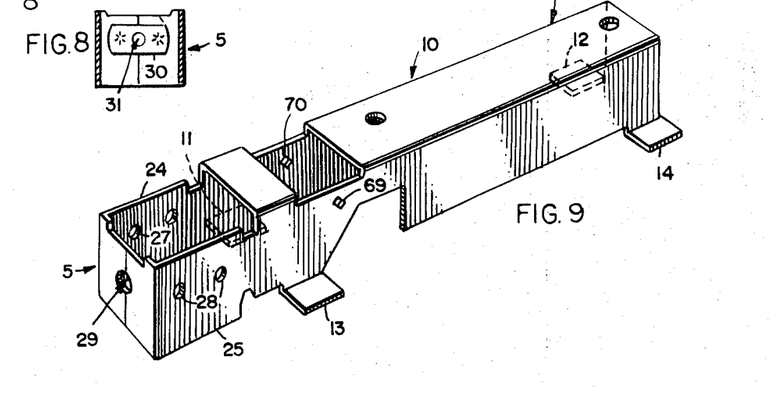
FIG. 8 is a sectional view taken along the line 8,8 of FIG. 7.
FIG. 9 is a perspective view of a rigid tubular structure which is affixed to the base.

Referring to FIG. 6, the base 1 contains a rigid elongated tubular structure 10 which is shown in perspective in FIG. 9 and has outwardly extending ears 11, 12, 13, and 14 which are welded or otherwise secured to the upper side 15 of the bottom of base 1. Adjacent each of the corners of base 1 and in general rectangular alignment with one another are fulcrum supports 16, 17, 18 and 19. To increase the rigidity of the base 1, two elongated upwardly extending areas 20 and 21 are provided. A three-pronged downwardly extending recessed area 22 is also provided. Base 1 is supported on circular downwardly projecting areas 23.

One end of the elongated tubular structure 10 forms the extension 5 which projects outwardly from base 1. The upwardly extending members 6,6 are secured to the inner sides 24 and 25 of extension 5 by means of rivets 26 or other suitable means in holes 27,27 and 28,28. A hole 29 is provided to receive a machine screw or other suitable fastening means as hereinafter more fully explained. A plate 30 is welded or otherwise secured on the inside of the end of extension 5 and contains a hole 31 which is aligned with the hole 29 and provides a seat for a machine screw or other suitable fastening device. This plate also serves to reinforce and hold together the ends of the elongated tubular member 10. The elongated tubular member 10 is preferably constructed of metal which is stamped as a metal blank and then reformed into the structure shown.

Figure 11:
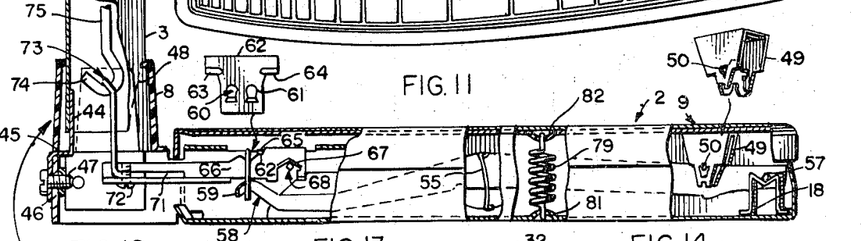
FIG. 11 is a side view with parts broken away and partly in section of the structure shown in FIG. 10.
Figure 12:
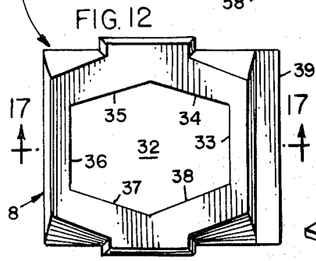
FIG. 12 is a top plan view of a collar which is slidable on the column or pillar so as to hold the column or pillar in an upright position when the collar is in the lower position and permit the column or pillar to be folded to a horizontal position when the collar is raised.
Figure 13:
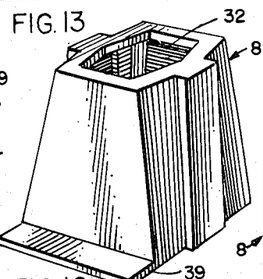
FIG. 13 is a perspective view of the collar shown in FIG. 12.
Figure 14:
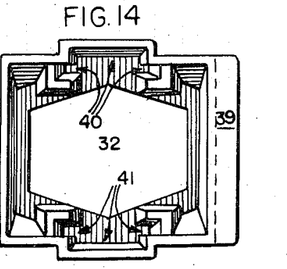
FIG. 14 is a bottom plan view of the collar shown in FIGS. 12 and 13.
Figures 15, 16:
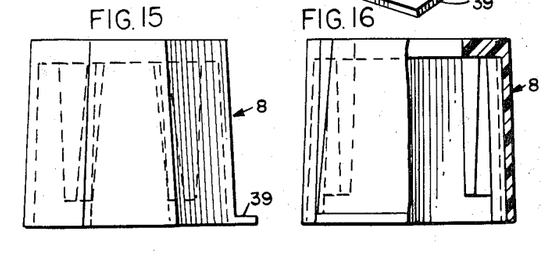
FIG. 15 is a side view of the collar shown in FIG. 12.
FIG. 16 is a view partly in section of the other side of the collar shown in FIG. 15.
Figure 17:
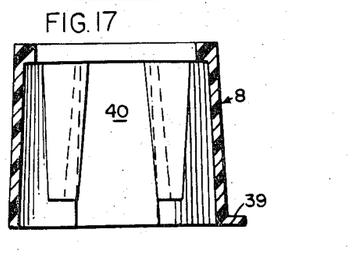
FIG. 17 is a sectional view taken along the line 17,17 of FIG. 12.

The slidable collar 8 has a central opening 32 which has six sides 33, 34, 35, 36, 37 and 39 that are adapted to slide on and fit closely to the sides of column or pillar 3. The outer sides of collar 8 slope downwardly and outwardly to a base portion which has an extension 39 on the side adjacent the weighing platform. Collar 8 is usually molded from a suitable plastic material but can be made from metal or any other material having the necessary rigidity. The recessed portions 40 and 41 on the inside of collar 8 are adapted to accommodate the upwardly extending members 6,6 so that when collar 8 is in its lowermost position as shown in FIG. 11 column or pillar 3 is incapable of pivoting around pivot members 7,7.

Figure 10:
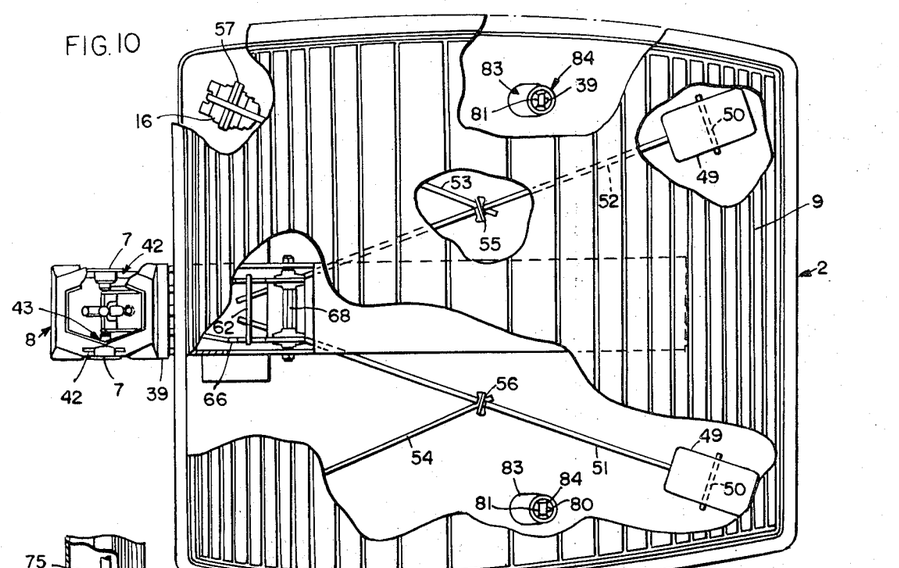
FIG. 10 is a top plan view with parts broken away showing portions of the weighing platform and portions of the weighing mechanism.

The pivot members 7,7 as shown in FIG. 10 extend inwardly through holes 42,42 in the upwardly extending pillar brackets 6,6 and are received in aligned holes 43 in column or pillar 3.

A stop member 44 is welded or otherwise secured to the inside of the lower end of column 3 and extends downwardly, then outwardly at 45 and downwardly again at 46. It contains an opening to receive a machine screw 47 or other suitable fastening means, so that, if desired, the column or pillar 3 can be secured by inserting machine screw 47 which will then be received through opening 29 and opening 30 in member 10 (see FIGS. 8 and 9). This increases the rigidity of the column or pillar when the scale is in its operating position. It will be understood that the screw 47 or similar device is optional and when it is used it has to be removed before the column or pillar 3 can be pivoted to its horizontal position. In order to facilitate folding the column or pillar to its horizontal position, a portion of the lower part of the column or pillar is cut away at 48 on both sides.

Weighing Mechanism

Referring to FIGS. 6, 10 and 11, the weighing platform 2 contains four platform legs 49, one adjacent each corner, each of which depends downwardly and contains corner loop 50 with a recess therein having a knife edge in the upper part of the recess adapted to fit in a recess on the levers 51, 52, 53, and 54. The levers 51 and 52 are long levers which converge in the general direction of pillar 3 and levers 53 and 54 are short levers which are connected to levers 53 and 54 at intermediate points by center loops 55 and 56. Each of the levers at one end contains a lever pivot 57 mounted on the fulcrum supports 16, 17, 18 and 19 (see FIG. 6). Thus, when an object is placed on the platform 2 the weight is transmitted through platform legs 49 and corner loops 50 to levers 51, 52, 53 and 54. The long levers 51 and 52 near their converging ends have a recessed portion 58 (FIG. 11). Each of the ends 59 of the long levers 51 and 52 is inserted through an opening 60 or 61 in multi-lever loop 62. The multi-lever loop 62 contains knife edges 63 and 64 which seat in recesses 65,65 in multiplying lever 66. Multiplying lever 66 has a V-bearing 67 mounted on lever pivot 68. Lever pivot 68 is mounted in openings 69 and 70 in tubular housing 10 (FIG. 9). When weight is applied to platform 2 it is thus transmitted through levers 51, 52, 53 and 54 to multi-lever loop 62 and then to multiplying lever 66 which in turn transmits the resultant force to nose iron 71. Nose iron 71 is secured to multiplying lever 66 by means of screw 72 or in any other suitable manner. The upper end 73 of nose iron 71 contains an opening adapted to receive steel yard hook 74 which is on one end of steel yard rod 75. The latter passes through hollow column or pillar 3 to beam loop 76 which has a V-bearing 77 mounted on load pivot 78 (see FIG. 19).

It will be noted that the juncture of the connection between steel yard hook 74 and the end 73 of nose iron 71 is approximately in alignment with pivot studs 7,7 about which column or pillar 3 rotates. Due to this fact it is unnecessary to have a flexible connection between the end 73 of nose iron 71 and steel yard hook 74.

When the platform 2 is assembled on the base 1 it is held in place by means of two coil springs 79 and 80 having hooks on the opposite ends thereof which engage the members 81 in the base and 82 on the underside of the platform. The members 81 are formed by cutting openings 83 and 84 in the bottom of the base on either side of member 81. Similarly the members 82 are formed by pressing downwardly and cutting portions of the platform 2.

Weight Indicating Means

Referring to FIGS. 18 to 23, at the top of column or pillar 3 and affixed thereto by welding or in any other suitable manner is a beam stand 85 which comprises a bifurcated member 86 having a pair of V-bearings 87 and 88 on which is mounted a fulcrum pivot 89 which in turn supports a fulcrum lever 90. The fulcrum lever 90 has an opening therein to receive load pivot 78 so that force transmitted to beam loop 76 pulls downwardly on V-bearings 77 which in turn cause load pivot 78 to move fulcrum lever 90 around fulcrum pivot 89. The upper part 91 of fulcrum lever 90 is fastened by means of screws or in any other suitable manner to the inside of the upper part 92 of the beam housing 93 of beam 4. A counterweight 94 is mounted on the righthand end of fulcrum lever 90 to counterbalance beam 4 which is off center with respect to fulcrum pivot 89.

Figure 21:
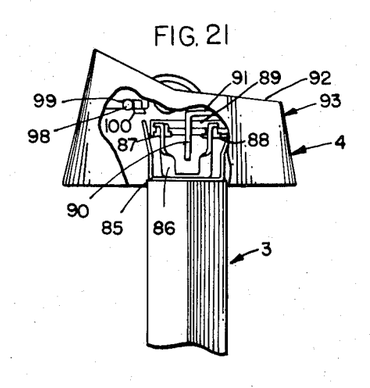
FIG. 21 is an end view with parts broken away of a portion of the lefthand side of the beam shown in FIG. 19.
Figure 22:
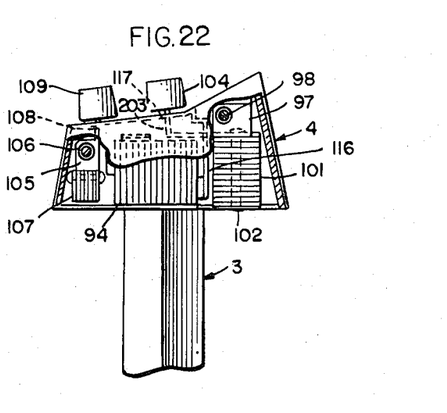
FIG. 22 is an elevational view partially in section with parts broken away of a portion of the righthand side of FIG. 19.
Figure 23:
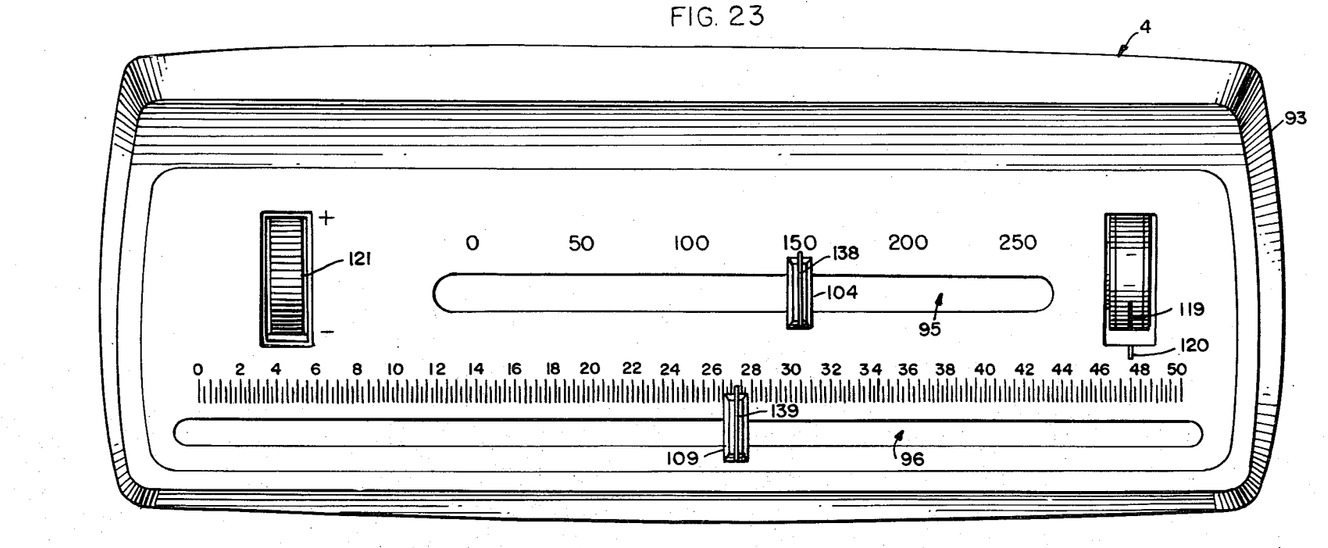
FIG. 23 is an enlarged top plan view of the beam shown in FIGS. 18 to 22 illustrating the weight indicating mechanism.

As shown in FIG. 23, the housing beam 4 contains an upper opening 95 to accommodate a large poise assembly and a lower opening 96 to accommodate a small poise assembly. The large poise assembly as shown in FIG. 22 consists of a bracket 97 mounted on a large poise rod 98 and adapted to slide thereon. The large poise rod 98 is connected at opposite ends to members 99 molded as an integral part of beam housing 93 and extending inwardly. As shown in FIG. 21 large poise rod 98 is seated in a recess in member 99 and held in place by screw 100. In a similar manner, the opposite end of rod 98 is held in place. Rod 98 extends from a point near the righthand end of beam 4 to a point just beyond the lefthand end of opening 95. Large poise weights 101 are secured beneath bracket 97 as shown in FIG. 22 and are held together by bolts or rivets 102, or in any other suitable manner. The poise weights are in the form of metal plates so that the amount of weight can be adjusted according to the number of metal plates used and finer adjustments can be made by boring holes in the metal plates. One end 103 of poise bracket 97 extends upwardly through opening 95 and is connected to knob 104 in the manner hereinafter described.

In a similar manner, a small poise bracket 105 is slidably mounted on a small poise rod 106. The rod 106 extends between two downwardly depending molded portions of housing 93 similar to members 99 and is mounted in a similar way except that rod 106 is longer and extends from one end of the inside of the housing 93 to the other. Small poise weights 107 are mounted on the lower end of bracket 105. The upper end 108 extends through opening 96 and is fastened to knob 109.

The fulcrum lever 90 has a notch or recess therein at 110. A bracket 111 is fastened to the bottom of beam stand 85 by means of a machine screw 112 or in any other suitable manner. The upper portion of bracket 111 has a transversely extending portion 113 which enters recess 110 and limits the movement of beam 4 in an upwardly direction. The top 114 of bracket 111 can be used to limit the downward movement of beam 4 by striking against the inside of the top of the housing 93.

Figure 18:
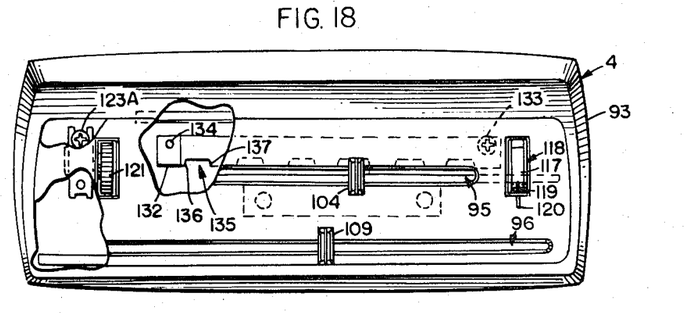
FIG. 18 is a plan view of the beam of a weighing scale of the type described in the preceding figures with parts broken away.
Figure 19:
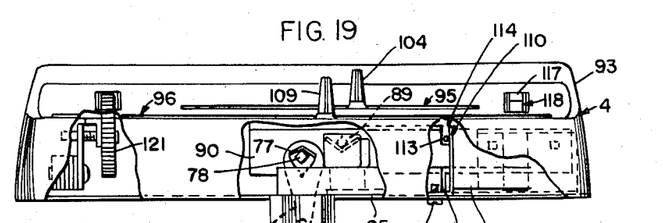
FIG. 19 is an elevational view of the beam shown in FIG. 18 and a portion of the column or pillar with parts broken away.

An indicator bracket 115 is welded or otherwise secured to the back of beam stand 85 and extends upwardly at 116 (see FIG. 22) and then outwardly at 117 so as to be received by opening 118 (see FIGS. 18 and 19). The member 117 contains an index mark 119 which when the beam 4 is in balance will be aligned with another index mark 120 on the top surface of housing 93.

As shown by FIG. 23, weight indicating means are applied to the top of housing 93 in the form of two scales, the upper scale being graduated from 0 to 250 pounds and being positioned beside opening 95, the lower scale being graduated from 0 to 50 pounds and being positioned beside opening 96. Thus, in this particular embodiment of the invention the weighing scale is adapted to weigh objects up to 300 pounds. The large poise assembly 6 controlled by knob 104 moves in opening 95 and the small poise assembly which is controlled by knob 109 moves in opening 96.

Figure 20:
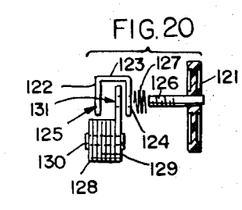
FIG. 20 is a detailed exploded view of the tare mechanism in the beam of the weighing scale shown in FIGS. 18 and 19.

In order to balance the beam 4 at 0 a tare weight assembly is provided which is controlled by knob 121. As shown in FIGS. 18, 19 and 20 the tare knob assembly consists of U-shaped bracket 122 which is secured by screws 123A or in any other suitable manner at 123 to the inside of the top of housing 93. Bracket 122 contains two components 124 and 125 which act as bearings for threaded shaft 126 which is secured at one end to tare knob 121 and which also contains a coil spring 127. Tare weights 128 are secured to an upside down T-shaped bracket 129 by means of rivet 130 or other suitable means. The leg of bracket 129 which extends upwardly has a threaded opening 131 adapted to receive threaded shaft 126. Thus when tare knob 121 is rotated clockwise tare weights 128 will move from left to right and when it is rotated counterclockwise tare weights 128 will move from right to left. This movement, although relatively slight, is sufficient to balance the beam 4 at a 0 setting.

Referring to FIGS. 18 and 22 it will be noted that the large poise weight assembly controlled by knob 104 is mounted with the poise weights 101 off center with respect to shaft 98. This causes the large poise weight assembly to be biased in the direction of notch plate 132 which is fastened by means of screws 133 and 134 or in any other suitable manner to the inside of the top of housing 93. The notch plate contains six notches or recesses 135 each having opposing tapered sides 136 and 137 that slope downwardly and inwardly at an angle of about 15° to 30° from the perpendicular. Each of the notches corresponds to a setting on the 0 to 250 pound scale. As knob 104 moves the large poise weight assembly in opening 95, the large poise weight assembly bracket 103 (FIG. 22) will automatically fall into a recess 135 due to the off center balancing of large poise weights 101 and assisted by the particular angle or slope of the sides 136 and 137 of the respective recesses. In order to release the large poise weight assembly to move bracket arm 103 from one recess to another, the user pulls knob 104 in the direction of the weighing platform 102 and then moves it to the desired position in opening 95.

Knob Assembly

Figure 24:
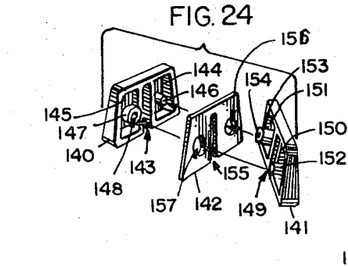
FIG. 24 is an exploded view showing the component parts of the knob assembly used on the weight indicating mechanism.

As shown in FIGS. 23 to 26, knob 104 has an indexing member 138 and knob 109 has indexing member 139. Knobs 104 and 109 are preferably made from a molded plastic material which consists of three components as illustrated in FIG. 24, namely, components 140, 141 and 142. Components 140 and 141 each have outer sides and inner sides, the inner sides having complementary means to hold them together, said complementary means being constructed to permit said members to be snapped together. Thus component 140 has a central channel 143 open at the lower end and a reentrant portion 144 and 145 on each side of said channel. The reentrant portion 144 contains a projecting portion 146 and the reentrant portion 145 contains a projecting portion 147 with a recess 148 therein. Component 141 similarly has a central channel 149 with reentrant portions 150 and 151 on each side of said channel. The reentrant portion 150 contains a projecting portion 152 and the reentrant portion 151 contains a projecting portion 153 with a recess 154 therein. The third component is the indexing insert 142 which contains a central recess 155 and apertures 156 and 157.

Figures 25, 26:
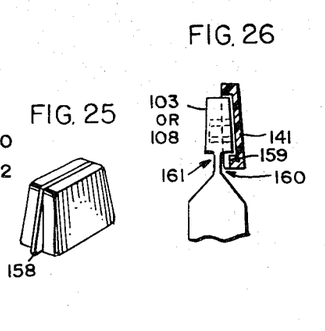
FIG. 25 is a perspective view of the assembled knob used on the weight indicating mechanism.
FIG. 26 is a cross sectional view showing the manner in which an off-set in the knob engages a notch in the poise assembly brackets.

The knob is assembled by snapping three components together after first aligning them so that projection 152 passes through opening 157 and seats in recess 148 in projecting portion 147 of component 140 and projection portion 146 passes through opening 156 and seats in recess 154 of projecting portion 153 of component 141. The central recess 155 of insert 142 will be aligned with the channels 143 and 149. Before the components are snapped together they are also placed over either the upper part 103 of large poise bracket 97 or the upper part 108 of small poise bracket 105. A mating step 159 projects inwardly at the bottoms of channels 143 and 149, respectively, which receives the notched portions 160 and 161 of bracket ends 103 or 108 as shown in FIG. 26. Thus the knob components 140 and 141 clamp and lock the upper end of the respective poise brackets between them. The insert 142 can be made of paper, plastic, metal or any other suitable material and is usually sized so that a portion 158 projects outwardly from the knob so as to serve as a pointer, and thereby make it easier for the user to register the position of the knob opposite the numerical scales. This is more important in the 0 to 50 pound scale.

General Mode of Operation

Figure 27:
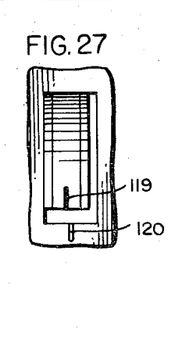
FIGS. 27, 28 and 29 are plan views of a portion of the beam shown in FIG. 23 illustrating the beam deflection as determined by comparing the beam index line with a stationary index line FIG. 27 illustrating the deflection when the beam is heavy, FIG. 28 illustrating the position of the indexing lines when the beam is in balance, and FIG. 29 illustrating the beam deflection when the beam is light.
Figure 28:
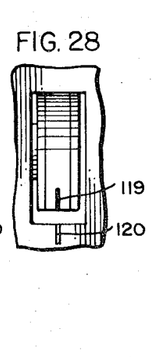
Figure 29:
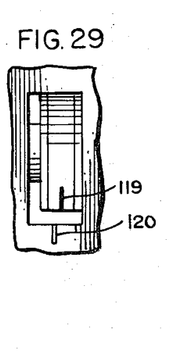

In the operation of the scale the zero adjustment is first made by moving the knobs 104 and 109 to a position opposite zero on the numerical scales and then rotating tare knob 121 until indexing marks 119 and 120 are opposite each other as shown in FIG. 28. If the beam is too heavy the indexing marks 119 and 120 will have the positions shown in FIG. 27 and it will be necessary to rotate the knob 121 counterclockwise toward the minus sign. If the beam is too light the indexing marks 119 and 120 will have the positions shown in FIG. 29 and it will be necessary to rotate the tare knob 121 clockwise toward the plus sign. It should be noted that the spring 127 (FIG. 20) which is mounted on shaft 126 serves to stabilize the tare knob assembly and prevent accidental movement of the tare knob after it has been adjusted to the balancing position. The small poise weight assembly is slightly off center and is capable of slight rotation, with knob 109 normally being biased in the direction of the 0–50 pound scale. Once knob 109 is set in a particular position the friction against which the small poise knob assembly moves on rod 106 plus the normal biasing in the direction of the 0–50 pound scale will keep knob 109 in a preset position. In order to determine the weight of a particular object knob 104 is moved to a preset position on the 0–250 pound scale where the weight of the object is more than 50 pounds and knob 109 is then moved to the balancing position, i.e., until indexing marks 119 and 120 are opposite each other as shown in FIG. 28. The weight of the object plasted on platform 2 will cause levers 51, 52, 53 and 54 to transmit the resultant force through multilever loop 62 to multiplying lever 66, then to nose iron 71 and to steel yard rod 75 through hook 74. Steel yard rod 75 pulls downwardly on beam loop 76 which engages load pivot 78 and pulls downwardly on fulcrum lever 90, thereby causing fulcrum lever 90 to move around fulcrum pivot 89. This movement is counterbalanced by the proper adjustment of knobs 104 and 109 as previously described.

The invention makes it possible to provide a simple type of folding beam scale which is reasonably accurate and quite compact. Some of the features of the invention such as folding pillar mechanism, the weighing mechanism and the knob assembly are not necessarily limited to beam scales but can be used on other types of weighing scales.

The invention is hereby claimed as follows:

1. In a weighing scale comprising a base, weighing mechanism mounted on said base, a weighing platform mounted on said weighing mechanism and weight indicating means operable in response to said weighing mechanism, a rigid elongated tubular structure fixed to said base beneath said weighing platform and force transmitting means inside said tubular structure arranged to transfer an accumulated force from said weighing mechanism to said weight indicating means, said rigid elongated tubular structure having an extension, a hollow column mounted at one end on said extension, said weight indicating means mounted adjacent the other end of said column and said force transmitting means being connected to said weight indicating means by connecting means disposed within said column.

2. A weighing scale as claimed in claim 1 in which said extension of said rigid elongated tubular structure extends outwardly from said base beyond said weighing platform to form an extension on said base.

3. In a weighing scale comprising a base, weighing mechanism mounted on said base, a weighing platform mounted on said weighing mechanism and weight indicating means operable in response to said weighing mechanism, a rigid elongated tubular structure fixed to said base beneath said weighing platform and force transmitting means inside said tubular structure arranged to transfer an accumulated force from said weighing mechanism to said weight indicating means, said weighing mechanism in said base comprising a pair of long levers, a pair of shorter levers, and four fulcrum supports each containing a fulcrum fixed to said base in spaced relationship as defined by the corners of a rectangle, the inner end of one of said shorter levers being connected to an intermediate section of one of said long levers, the inner end of the other of said shorter levers being connected to an intermediate section of the other of said long levers, the outer ends of said shorter members each containing a recessed portion pivoted on one of said four fulcrums, the outer ends of said long levers each containing a recessed portion pivoted on one of said four fulcrums, said long levers being arranged so as to converge toward one another at their inner ends and each having a recessed portion at its inner end, a multilever loop connecting and providing a fulcrum for each of said last mentioned recessed portions and having an opening therein with a knife edge on the upper part thereof, a multiplying lever having a V-bearing recess toward one end thereof facing upward to receive said knife edge of said multilever loop and another V-bearing recess adjacent said end facing downward, a pivot member to receive said last named V-bearing recess, said pivot member being mounted in said tubular member, and means connecting said multiplying lever adjacent said other end thereof to said weight indicating means.

4. In a weighing scale comprising a base, weighing mechanism mounted on said base, a weighing platform mounted on said weighing mechanism and weight indicating means operable in response to said weighing mechanism, a rigid elongated tubular structure fixed to said base beneath said weighing platform and force transmitting means inside said tubular structure arranged to transfer an accumulated force from said weighing mechanism to said weight indicating means, said rigid elonated tubular structure having an extension, a hollow column mounted at one end on said extension, said weight indicating means mounted adjacent the other end of said column and said force transmitting means being connected to said weight indicating means by connecting means disposed within said column, said weighing mechanism in said base comprising a pair of long levers, a pair of shorter levers, and four fulcrum supports each containing a fulcrum fixed to said base in spaced relationship as defined by the corners of a rectangle, the inner end of one said shorter lever being connected to an intermediate section of one of said long levers, the inner end of the other of said shorter levers being connected to an intermediate section of the other of said long levers, the outer ends of said shorter members each containing a recessed bearing portion pivoted on one of said four fulcrums, the outer ends of said long levers each containing a recessed bearing portion pivoted on one of said four fulcrums, said long levers being arranged so as to converge toward one another at their inner ends and each having a recessed bearing portion at its inner end, a multilever loop connecting and providing a fulcrum for each of said last mentioned recessed bearing portions and having an opening therein with a knife edge on the upper part thereof, a multiplying lever having a V-bearing recess toward the end thereof facing upward to receive said knife edge of said multilever loop and another V-bearing recess adjacent said end facing downward, a pivot member to receive said last named V-bearing recess, said pivot member being mounted on said base, and means connecting said multiplying lever adjacent said other end thereof to said beam through said hollow column.

* * * * *

UNITED STATES PATENT AND TRADEMARK OFFICE
CERTIFICATE OF CORRECTION

PATENT NO. : 3,827,515
DATED : August 6, 1974
INVENTOR(S) : William Y. Hutchinson and Walter P. Kushmuk It is certified that error appears in the above-identified patent and that said Letters Patent are hereby corrected as shown below:

Column 1, line 14, after "cumbersome", "of" should read --or--.

Column 4, line 63, "39" should read --38--.

Signed and sealed this 15th day of July 1975.

(SEAL)
Attest:

RUTH C. MASON
Attesting Officer

C. MARSHALL DANN
Commissioner of Patents
and Trademarks